(12) United States Patent
Zhang et al.

(10) Patent No.: US 10,070,364 B2
(45) Date of Patent: Sep. 4, 2018

(54) NEIGHBOR CELL SYSTEM INFORMATION PROVISIONING

(71) Applicant: Intel IP Corporation, Santa Clara, CA (US)

(72) Inventors: Yujian Zhang, Beijing (CN); Youn Hyoung Heo, San Jose, CA (US); Candy Yiu, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 341 days.

(21) Appl. No.: 14/704,195

(22) Filed: May 5, 2015

(65) Prior Publication Data

US 2016/0021584 A1      Jan. 21, 2016

Related U.S. Application Data

(60) Provisional application No. 62/027,181, filed on Jul. 21, 2014.

(51) Int. Cl.
*H04W 36/30*      (2009.01)
*H04W 36/36*      (2009.01)
(Continued)

(52) U.S. Cl.
CPC ....... *H04W 36/30* (2013.01); *H04W 36/0061* (2013.01); *H04W 76/19* (2018.02);
(Continued)

(58) Field of Classification Search
CPC ...... H04L 36/0061; H04L 36/08; H04L 36/36
See application file for complete search history.

(56) References Cited

U.S. PATENT DOCUMENTS

| 2007/0133456 A1* | 6/2007 | Ding | H04W 72/005 370/328 |
| 2008/0212522 A1* | 9/2008 | Ko | H04W 48/12 370/328 |

(Continued)

FOREIGN PATENT DOCUMENTS

| WO | 2011135102 A1 | 11/2011 |
| WO | 2013048575 A1 | 4/2013 |
| WO | 2014014317 A1 | 1/2014 |

OTHER PUBLICATIONS

3GPP, "Technical Specification Group Radio Access Network; Evolved Universal Terrestrial Radio Access (E-UTRA); Radio Resource Control (RRC); Protocol specification (Release 12)," 3GPP TS 36.331 V12.2.0 (Jun. 2014), Jul. 4, 2014, 365 pages.

(Continued)

*Primary Examiner* — Hoon J Chung
(74) *Attorney, Agent, or Firm* — Schwabe, Williamson & Wyatt, P.C.

(57) ABSTRACT

Embodiments of the present disclosure describe systems, devices and methods for system information acquisition in radio resource connection (RRC) connection reestablishment when Radio Link Failure (RLF) happens. Various embodiments may include a serving cell that provides system information of a neighbor cell to a user equipment (UE). When the UE detects an RLF event, the UE may determine whether the previously received system information is valid and proceed with RRC connection reestablishment based on the determination. Other embodiments may be described or claimed.

6 Claims, 5 Drawing Sheets

(51) Int. Cl.
*H04W 36/00* (2009.01)
*H04W 76/19* (2018.01)
*H04W 36/08* (2009.01)
*H04W 48/12* (2009.01)
*H04W 88/02* (2009.01)

(52) U.S. Cl.
CPC ............ *H04W 36/08* (2013.01); *H04W 36/36* (2013.01); *H04W 48/12* (2013.01); *H04W 88/02* (2013.01)

(56) References Cited

U.S. PATENT DOCUMENTS

| | | | |
|---|---|---|---|
| 2010/0022250 A1 | 1/2010 | Petrovic et al. | |
| 2010/0272015 A1* | 10/2010 | Chmiel | H04W 48/12 370/328 |
| 2010/0303039 A1 | 12/2010 | Zhang et al. | |
| 2011/0159880 A1* | 6/2011 | Kumar | H04W 76/028 455/450 |
| 2015/0099501 A1* | 4/2015 | Kim | H04W 52/0216 455/418 |
| 2015/0181575 A1* | 6/2015 | Ng | H04L 5/0092 370/329 |
| 2015/0358966 A1* | 12/2015 | Zheng | H04W 72/0446 370/329 |

OTHER PUBLICATIONS

International Search Report and Written Opinion for International Application No. PCT/US2015/034957 dated Oct. 16, 2015; 16 pages.
Partial Supplementary European Search Report dated Nov. 28, 2017 from European Patent Application No. 15824192.7, 21 pages.
Samsung, "Fallback cell for re-establishment," 3GPP TSG-RAN WG2 #82, R2-131909, Agenda Item: 71.2, May 20-24, 2013, Fukuoka, Japan 2 pages.
Office Action dated Feb. 13, 2018 from Japanese Patent Application No. 2016-569815, 5 pages.
Samsung, "Open Issues for provisioning dedicated SIB-1," 3GPP TSG-RAN2#80, R2-125793, Agenda Item: 7.5, Nov. 12-Nov. 16, 2012, New Orleans, USA, 2 pages.
Catt, "Change the power level in test case 8.4.1.7a for LCR TDD," 3GPP TSG RAN WG5 Meeting #56 , R5-123191, Change Request, 34.123-1, CR. CRNum, Current version: 10.1.0, Aug. 13-17, 2012, Qingdao, China, 27 pages.
Samsung, "RRC signalling support for SIB-1 acquisition in FeICIC," 3GPP TSG-RAN2#79 meeting, Tdoc R2-123582, Agenda Item: 7.5, Aug. 12-18, 2012, Qingdao, China, 3 pages.
Japanese Patent Office—Notification of Reasons for Refusal dated Feb. 13, 2018 from Japanese Patent Application No. 2016-569815, 5 pages.
European Patent Office—Extended European Search Report dated Mar. 8, 2018 from European Patent Application No. 15824192.7, 18 pages.
European Patent Office—New European Search Report dated Mar. 21, 2018 from European Patent Application No. 15824192.7, 7 pages.

* cited by examiner

US 10,070,364 B2

NEIGHBOR CELL SYSTEM INFORMATION PROVISIONING

CROSS REFERENCE TO RELATED APPLICATIONS

The present application claims priority to U.S. Provisional Patent Application No. 62/027,181, filed Jul. 21, 2014, entitled "NEIGHBOR CELL SYSTEM INFORMATION PROVISIONING," the entire disclosure of which is hereby incorporated by reference.

FIELD

Embodiments described herein generally relate to the field of communications, and more particularly, to neighboring cell system information provisioning.

BACKGROUND

System information is divided into a Master Information Block (MIB), which conveys a limited number of essential and most frequently transmitted parameters that are needed to acquire other information from a cell, and a number of System Information Blocks (SIBs), which convey dynamic system information. The MIB defines the most essential physical layer information of a cell required to receive further system information. SystemInformationBlockType1 (SIB1) contains information relevant when evaluating if a UE is allowed to access a cell and defines scheduling of other SIBs. Other SIBs are sets of related system information.

Change of system information only occurs at specific radio frames that are, for example, in a modification period. System information may be transmitted a number of times with the same content within a modification period, as defined by its scheduling. The modification period boundaries may be defined by System frame Number (SFN) values for which SFN mod m=0, where m is the number of radio frames comprising the modification period. The modification period may be configured by system information.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), or memory (shared, dedicated, or group) that execute one or more software or firmware programs, a combinational logic circuit, or other suitable hardware components that provide the described functionality.

Figure 1:
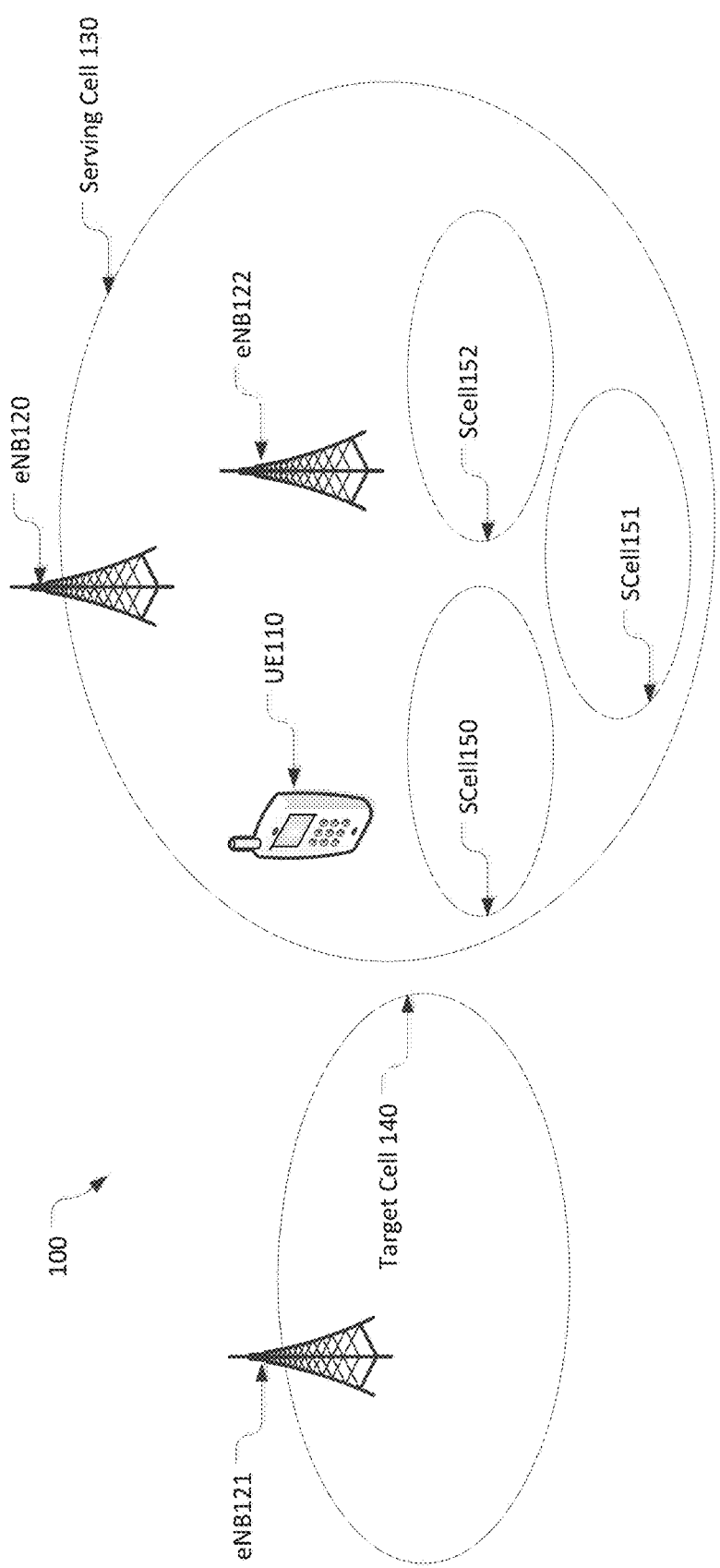
FIG. 1 is a diagram of an embodiment of wireless communication system, in accordance with various embodiments.

FIG. 1 illustrates a wireless communication system 100 in accordance with some embodiments. The wireless communication system may include a number of eNBs including, for example, eNBs 120, 121, and 122. The eNBs 120, 121, and 122 may provide various serving cells for any number of user equipments (UEs) such as, for example, UE 110. In some embodiments, the eNB 120 may provide a serving cell 130 for the UE 110, which may be a primary serving cell (PCell), and eNB 122 may provide a number of secondary serving cells (SCells), for example, SCells 150, 151, and 152 for the UE 110. The eNB 121 may be a neighbor eNB that provides a target cell 140 to which the UE 110 may transfer one or more connections as described herein. In various embodiments, the wireless communication system may be an evolved universal radio access network (E-UTRAN) of a 3rd Generation Partnership Project (3GPP) Long Term Evolution-Advanced (LTE-A) system.

In some embodiments, a radio link failure (RLF) may occur when the radio quality of a serving cell is not sufficient to support ongoing communications with a desired level of service. If an RLF occurs, the UE 110 may perform a Radio Resource Control (RRC) connection re-establishment to connect to a target cell with suitable channel quality. The target cell may be a neighbor cell or a secondary cell. The UE 110 may experience a service outage from a time at which a serving cell is unable to maintain previous ongoing service until a time in which a new serving cell may provide the service. One of the main components for outage time during RLF may be system information acquisition.

3GPP Technical Specification (TS) 36.133 V10.1.0 (2011-01) describes how RRC connection re-establishment may be performed when RLF occurs. The time that it takes for RRC re-establishment may be defined as: $T_{UE\_re-establish\_delay}$=50 ms+$N_{freq}$*$T_{search}$+$T_{SI}$+$T_{PRACH}$. $N_{freq}$ may be the total number of E-UTRAN frequencies to be monitored for RRC re-establishment ($N_{freq}$=1 if the target PCell is known); $T_{search}$ may be the time required by the UE 110 to search the target PCell ($T_{search}$=100 ms if the target PCell is known by the UE 110 and 800 ms if the target PCell is unknown by the UE 110 (e.g., has not been measured by the UE 110 in the last 5 seconds); TSI may be the time required for receiving all the relevant system information according to the reception procedure and the RRC procedure delay of system information blocks defined in 3GPP TS 36.331 for the target PCell ($T_{SI}$=1280 ms in some instances); and $T_{PRACH}$ may be the additional delay caused by the random access procedure ($T_{PRACH}$=15 ms in some instances, which includes 10 ms due to random access occasion plus additional delay due to ramping procedure). Thus, it can be seen that system information acquisition is the main component for RRC connection re-establishment delay.

In current LTE systems, when there is a handover, a target eNB may generate the handover command, which contains the related system information of target eNB. The source eNB may then transmit the handover command (for example, an RRCConnectionReconfiguration message with mobilityControlInfo) to a UE. For carrier aggregation, necessary system information of SCells may be provided via dedicated RRC signaling. For dual connectivity, Master eNodeB (MeNB) may provide a UE the system information of Secondary eNB (SeNB) via dedicated RRC signaling. Propagating the related system information in this manner may not be effective in RLF situations.

Embodiments of the present disclosure describe an eNB proactively providing system information of neighbor cells to a UE. If an RLF were to occur, the UE may not need to read system information (in most cases) during a time of cell selection because the original system information corresponding to the neighbor cell may be valid most of the time. This may significantly reduce a time of system information acquisition (0 to tens of milliseconds). And, since system information acquisition is a major component of the entire outage time that corresponds to RRC connection reestablishment after RLF, the time that it takes for RRC reestablishment may be significantly reduced.

Referring again to FIG. 1, embodiments of the present disclosure describe various ways in which a serving eNB, e.g., the eNB 120 or 122 will provide system information about a neighbor cell, for example, target cell 140, to the UE 110. If RLF occurs, the UE 110 may determine whether it has valid system information to perform the RRC reestablishment with the target cell 140.

In a first embodiment, a serving eNB, for example, eNB 120 or 122, may broadcast system information of neighbor cells, for example, target cell 140, within a corresponding serving cell. The system information may be broadcast as, for example, a new System information Block (SIB) (for example, SIB17). A "new" SIB may refer to a SIB that has not been defined by previous 3GPP TSs. The UE 110 may either acquire the new SIB when it is in an RRC_CONNECTED state, or the UE 110 may only acquire the new SIB when a certain condition is met. For example, the UE 110 may acquire the new SIB when a serving cell quality (for example, Reference Signal Received Power (RSRP) or Reference Signal Received Quality (RSRQ)) is below a predetermined threshold. Such predetermined threshold can be configured by the network. For example, the eNB 120 can configure the predetermined threshold in a measurement configuration provided to the UE 110.

In a second embodiment, a serving eNB, for example, eNB 120 or eNB 122, may provide system information of neighbor cells, for example, target cell 140, via dedicated RRC signaling. In some embodiments, a new RRC message may be introduced. A "new" RRC message may refer to an RRC message that has not been defined by previous 3GPP TSs. In some embodiments, an existing RRC message (e.g. RRCConnectionReconfiguration) can be extended for the purpose of providing system information of neighbor cells. For each UE, a serving eNB can decide whether to transmit system information of neighbor cells, and the serving eNB can determine the set of neighbor cells whose system information are to be transmitted to the UE. The serving eNB can make such decisions based on, for example, a measurement report provided by the UE 110.

In both first and second embodiments described above, a system information value tag (systemInfoValueTag) and/or Broadcast Control Channel (BCCH) modification period information can be provided to the UE 110 to facilitate the UE in determining the target cell system information. The systemInfoValueTag may be associated with the target cell system information provided to the UE from the serving eNB. The actual modification period, expressed in number of radio frames, may be equal to a modification period coefficient (modificationPeriodCoeff)*a default paging cycle (defaultPagingCycle), wherein modificationPeriodCoeff is an integer which can be 2, 4, 8, 16 and so on.

The eNBs 120, 121, and 122 may communicate with one another over X2 interfaces. In some embodiments, the eNBs 120, 121, and 122 may exchange updated system information over these X2 interfaces.

The SIB1 may include a value tag, systemInfoValueTag, that indicates whether a change has occurred in the system information. The UE 110 may use the systemInfoValueTag, for example, upon return from out of coverage, to verify if the previously stored system information is still valid. Additionally, the UE may consider the stored system information to be invalid after a predetermined amount of time, for example, 3 hours from the moment it was successfully confirmed as valid, unless specified otherwise.

Figure 2:
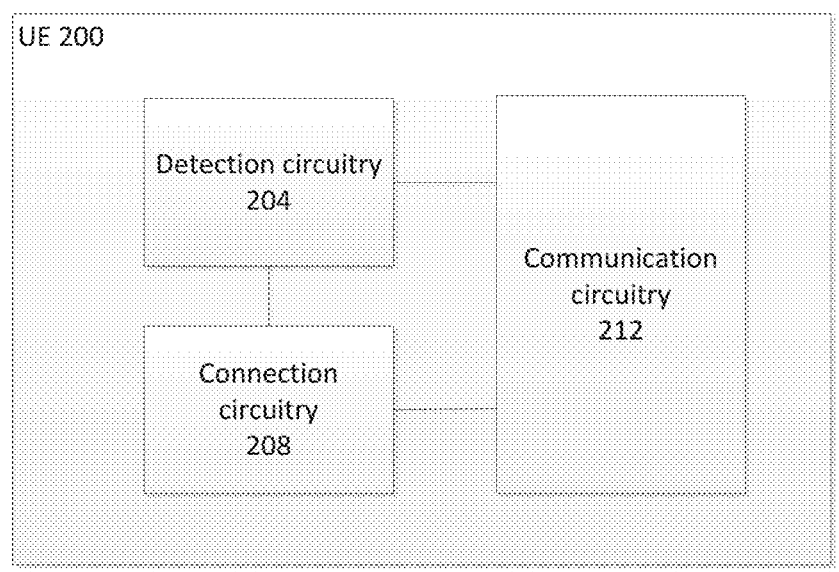
FIG. 2 is a user equipment in accordance with various embodiments.

FIG. 2 illustrates a UE 200 in accordance with some embodiments. The UE 200 may be similar to, and substantially interchangeable with UE 110. The UE 200 may include, for example, detection circuitry 204, connection circuitry 208 and communication circuitry 212 coupled with each other at least as shown.

Briefly, the detection circuitry 204 may include logic that is specifically configured to detect an RLF event. In some embodiments, the detection circuitry 204 may receive, e.g., from communication circuitry 212, periodic quality metrics that relate to a provided level of service. The detection circuity 204 may compare the received quality metrics to a predetermined threshold to determine whether the provided level of service is sufficient to support ongoing communications with the desired level of service. In some embodiments, the detection circuitry 204 may be preprogramed with the desired level of service or it may be dynamically configured with the desired level of service through, e.g., the communication circuitry 212.

The connection circuitry 208 may, in general, be used to control various communication connections for the UE 200. In some embodiments, the connection circuitry 208 may implement one or more protocol layers that establish and maintain communication connections with corresponding protocol layers established in other network entities, e.g., eNBs, network controllers, etc. As described with respect to various embodiments herein, the connection circuitry 208 may establish an RRC connection with an RRC layer in, e.g., an eNB. If the connection circuitry 208 is informed, by the detection circuitry 204, of an occurrence of an RLF event, the connection circuitry 208 may perform operations associated with an RRC connection re-establishment procedure as described herein. These operations may include, for example, acquiring system information, determining whether the acquired system information remains valid, and using the system information to establish an RRC connection with a target cell.

The communication circuitry 212 may be used to implement various communication protocols to facilitate communication over one or more networks. In some embodiments, the networks may be, for example, an E-UTRAN as described above with respect to FIG. 1. The communication circuitry may encode/decode signals for communication and, generally, perform radio control functions as described below with respect to FIG. 5.

Figure 3:
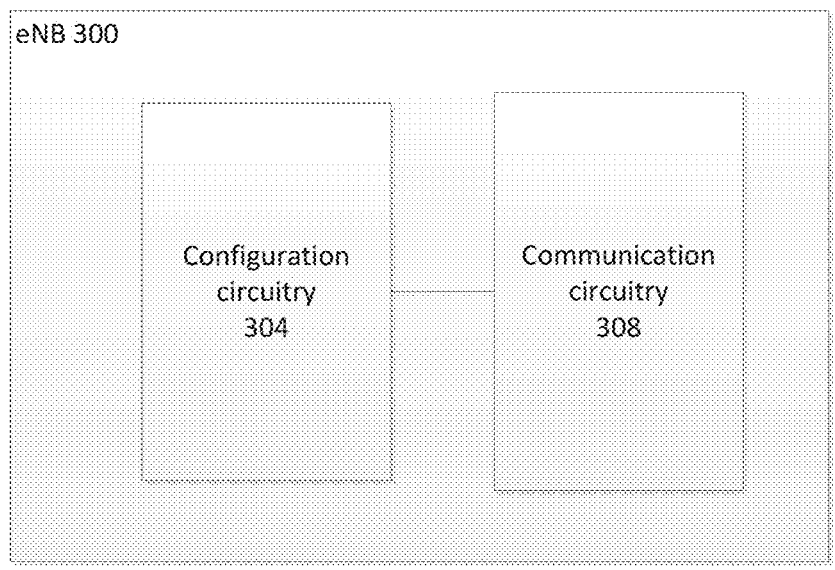
FIG. 3 is an eNB in accordance with various embodiments.

FIG. 3 illustrates an eNB 300 in accordance with some embodiments. The eNB 300 may be similar to, and substantially interchangeable with eNB 120 or 122. The eNB 300 may include, for example, configuration circuitry 304 and communication circuitry 308 coupled with each other at least as shown.

The communication circuitry 308 may include logic to implement various communication protocols to facilitate communication over one or more networks. In some embodiments, the networks may be, for example, an E-UTRAN as described above with respect to FIG. 1, and one or more wired networks, for example, an Ethernet network, to communicate with core components, other eNBs, etc. The communication circuitry 308 may encode/decode signals for communication over appropriate networks.

The configuration circuitry 304 may include logic to provide operations of an eNB providing a serving cell as described herein. In particular, the configuration circuitry 304 may receive, via the communication circuitry 308, system information from one or more neighbor eNBs. The received system information may include information that the neighbor eNBs also transmit in SIBs in the neighbor cell. The configuration circuitry may then generate system information messages and control the communication circuitry 308 to transmit the generated system information messages to UEs connected with the eNB through the serving cell. In some embodiments, the system information messages may provide the system information received from the neighbor eNBs in addition to one or more parameters that may be used by the UE to determine whether previously provided system information is still valid (e.g., systemInfoValueTag and/or BCCH modification period information (e.g., modificationPeriodCoeff IE and defaultPagingCycle).

Figure 4:
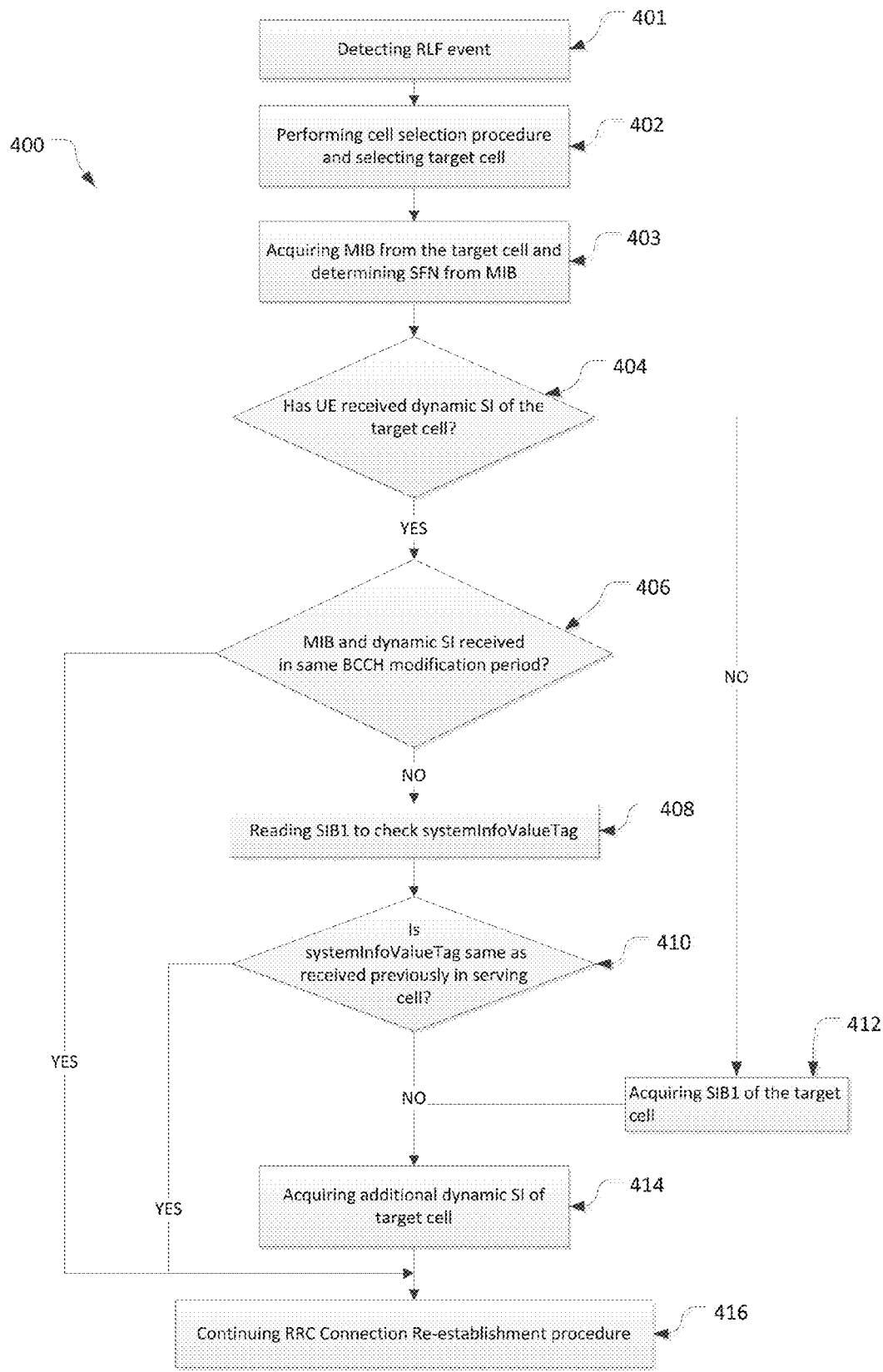
FIG. 4 illustrates flow diagram of the UE behavior in accordance with various embodiments.

FIG. 4 is a flow diagram illustrating a method 400 that may be performed by a UE, e.g., UE 110 or UE 200, in accordance with various embodiments. In some embodiments, the UE may include or have access to one or more non-transitory computer-readable media having instructions, stored thereon, that when executed cause the UE to perform the method.

In some embodiments, block 401 of the method 400 may be performed by detection circuitry 204 (possibly in conjunction with communication circuitry 212) and the remaining blocks of the method 400 may be performed by connection circuitry 208 (possibly in conjunction with communication circuitry 212).

At block 401, the method 400 may include detecting an RLF event. The detecting of the RLF event may be done by, e.g., the detection circuitry 204 determining that a level of service provided by an existing connection/cell is insufficient to adequately support ongoing communications.

At block 402, the method 400 may include performing a cell selection procedure and selecting a target cell, for example, target cell 140. In some embodiments, the target cell may be selected based on information transmitted to the UE in neighbor reports from the neighbor cells, serving cell, etc.

At block 403, the method 400 may include acquiring a Master Information Block (MIB) from the target cell and determining System Frame Number (SFN) from the MIB. The MIB may be periodically broadcast by the target cell using, for example, a physical broadcast channel (PBCH). The MIB may include, for example, three bits for system bandwidth, three bits for physical hybrid automatic repeat request indicator channel (PHICH), and eight bits for SFN.

At block 404, the method 400 may include determining whether the UE has received dynamic system information (SI) of the target cell 140. The dynamic SI may be the SI from one or more SIBs that will enable the UE to complete the RRC connection re-establishment procedure with the target cell. The dynamic SI may include, but is not limited to, SIB scheduling information, cell ID, common/shared channel information, cell re-selection information, uplink power control, preamble power ramping, uplink cyclic prefix length, sub-frame hopping, etc.

The dynamic SI of the target cell 140 may have been previously received from the serving cell (either in broadcast or dedicated signaling) and stored in storage media of the UE. Thus, the determining at 404 may include checking storage media on the UE to determine whether the previously provided dynamic SI is locally available.

If the UE 110 has received the dynamic SI, the method 400 may include determining, at block 406, whether the UE received the MIB in the same BCCH modification period in which the UE 110 received the dynamic SI from the serving cell.

If the MIB was received in the same BCCH modification period as the previously received dynamic SI, the method 400 may advance to continuing the RRC Connection Re-establishment procedure at block 416 using the previously-received dynamic SI.

If, at block 406, it is determined that the MIB was not received in the BCCH modification period in which the UE 110 received the dynamic SI, e.g., the UE 110 received the dynamic SI in a previous BCCH modification period, the method 400 may include reading a SIB1 to check the systemInfoValueTag at block 408. The SIB1 may be received by the UE directly from the target cell.

At block 410, the method may include determining a validity of the stored dynamic SI. This may be done by determining whether systemInfoValueTag, from the current SIB1, is the same as the systemInfoValueTag associated with the dynamic SI previously received in the serving cell. If the systemInfoValueTags are the same, the UE may consider the previously-received dynamic SI to be valid and the method 400 may advance to block 416. In this manner, the UE can verify that the stored dynamic SI remains valid by checking systemInfoValueTag in the current SIB1 when the dynamic SI of the target cell and the MIB of the target cell were not received in the same BCCH modification period.

If the systemInfoValueTags are determined to be different at block 410, the UE may consider the stored dynamic SI to be invalid and the method 200 may proceed to acquiring additional dynamic SI of the target cell 140. The additional dynamic SI acquired from the target cell 140 at block 414 may be dynamic SI included in SIBs other than SIB1, given that SIB1 was previously received at block 408.

If it is determined, at block 404, that the UE 110 has not received the system information of the target cell, the method 400 may include acquiring SIB1 of the target cell from the target cell at block 412; and then acquiring additional dynamic SI from other SIBs at block 414.

Following block 414, the method 400 may advance to continuing RRC connection re-establishment procedure at 416 with the obtained dynamic SI.

Concepts similar to those described above may be useful in both carrier aggregation and dual connectivity systems as will be described below.

In various embodiments, enhancements for carrier aggregation systems are provided in which necessary system information of SCells is provided via dedicated RRC signaling. In these embodiments, the target cell may be an SCell. When there is an RLF and a UE has to select another SCell, the UE 110 may need to acquire system information again since the UE 110 may not know whether the previously stored system information is valid or not. The reason is that neither systemInfoValueTag nor BCCH modification period may be transmitted in dedicated RRC signaling (RadioResourceConfigCommonSCell). Therefore after RLF, if the UE 110 selects one of the SCells, after reading SIB1 of the cell, the UE 110 may not know whether system information has changed or not. Furthermore, the UE may not know the BCCH modification period of the SCell. So, if RLF happens, the UE 110 may use a conservative assumption with respect to the length of the BCCH modification period; for example, assume that the BCCH modification period is 640 ms.

In some embodiments, system information of SCells of SeNB, systemInfoValueTag, and/or BCCH modification period information may be provided to a UE through dedicated signaling from a serving eNB. The system information of the Scells may be provided in, e.g., a RadioResourceConfigCommonSCell information element (IE). If the UE determines that the SCell system information is valid, UE can skip system information acquisition and continue RRC connection re-establishment procedure (e.g., initiate random access procedure). Therefore, the time of RRC re-establishment may be largely reduced when RLF happens.

If the timing difference between the time that UE checks system information validity and that UE is provided with system information via dedicated RRC signaling is within BCCH modification period, then the UE can assume that the dedicated system information is still valid so UE can skip system information acquisition and continue RRC connection re-establishment procedure (e.g., initiate random access procedure).

Currently, the BCCH modification period may be derived from modificationPeriodCoeff IE and defaultPagingCycle, which can be provided in the dedicated signaling. One example ASN.1 code change for 3GPP TS 36.331 is show below, with the additions shown as underline. In the example, both systemInfoValueTag and BCCH modification period information are provided.

```
RadioResourceConfigConantonSCell-r10 ::=        SEQUENCE {
    -- DL configuration as well as configuration applicable for DL and UL
    nonUL-Configuration-r10                     SEQUENCE {
        -- 1: Cell characteristics
        dl-Bandwidth-r10                        ENUMERATED {n6, n15, n25, n50, n75, n100},
        -- 2: Physical configuration,general
        antennaInfoCommon-r10                       AntennaInfoCommon,
        mbsfn-SubframeConfigList-r10            MBSFN-SubframeConfigList    OPTIONAL, -- Need OR
        -- 3: Physical configuration, control
        phich-Config-r10                        PHICH-Config,
        -- 4: Physical configuration, physical channels
        pdsch-ConfigCommon-r10                      PDSCH-ConfigCommon,
        tdd-Config-r10                              TDD-Config              OPTIONAL -- Cond
TDDSCell
    },
    -- UL configuration
    ul-Configuration-r10                        SEQUENCE {
        ul-FreqInfo-r10                         SEQUENCE {
            ul-CarrierFreq-r10                  ARFCN-ValueEUTRA            OPTIONAL, -- Need OP
            ul-Bandwidth-r10                    ENUMERATED {n6, n15,
                                                    n25, n50, n75, n100}   OPTIONAL, -- Need OP
            additionalSpectrumEmissionSCell-r10     AdditionalSpectrumEmission
        },
        p-Max-r10                               P-Max                       OPTIONAL, -- Need OP
        uplinkPowerControlCommonSCell-r10           UplinkPowerControlComnionSCell-r10,
        -- A special version of IE UplinkPowerControlCommon may be introduced
        -- 3: Physical configuration, control
        soundingRS-UL-ConfigCommon-r10          SoundingRS-UL-ConfigCommon,
        ul-CyclicPrefixLength-r10               UL-CyclicPrefixLength,
        -- 4: Physical configuration, physical channels
        prach-ConfigSCell-r10                   PRACH-ConfigSCell-r10       OPTIONAL, -- Cond TDD-
OR-NoR11
        pusch-ConfigCommon-r10                  PUSCH-ConfigCommon
    }                                                                       OPTIONAL, -- Need OR
    ...,
    [[  ul-CarrierFreq-v1090                    ARFCN-ValueEUTRA-v9e0       OPTIONAL -- Need OP
    ]],
```

| | | |
|---|---|---|
| [[ rach-ConfigCommonSCell-r11<br>Cond UL | RACH-ConfigCommonSCell-r11 | OPTIONAL, -- |
| prach-ConfigSCell-r11 | PRACH-Config | OPTIONAL, -- Cond UL |
| tdd-Config-v1130 | TDD-Config-v1130 | OPTIONAL, -- Cond TDD2 |
| uplinkPowerControlCommonSCell-v1130 | UplinkPowerControlCommonSCell-v1130 | OPTIONAL -- Cond UL |
| ]], | | |
| [[ systemInfoValueTag | INTEGER (0..31) | |
| modificationPeriodCoeff | ENUMERATED {n2, n4, n8, n16}, | |
| defaultPagingCycle | ENUMERATED { | |
| rf32, rf64, rf128, rf256} | | |
| ]] | | |
| } | | |

In various embodiments, enhancements for dual connectivity systems are provided. Currently in dual connectivity, necessary system information of SCells of SeNB may be provided via dedicated RRC signaling. When there is RLF and the UE 110 selects one of the SCells of SeNB, the UE 110 may need to acquire system information again since the UE 110 does not know whether the previously stored system information is valid or not. The reason is similar as the discussion for carrier aggregation.

Therefore, various embodiments of the present disclosure may utilize dedicated signaling to provide system information of SCells of SeNB, systemInfoValueTag, and/or BCCH modification period information. Currently, BCCH modification period is derived from IE modificationPeriodCoeff and defaultPagingCycle, which can be provided in the dedicated signaling.

Figure 5:
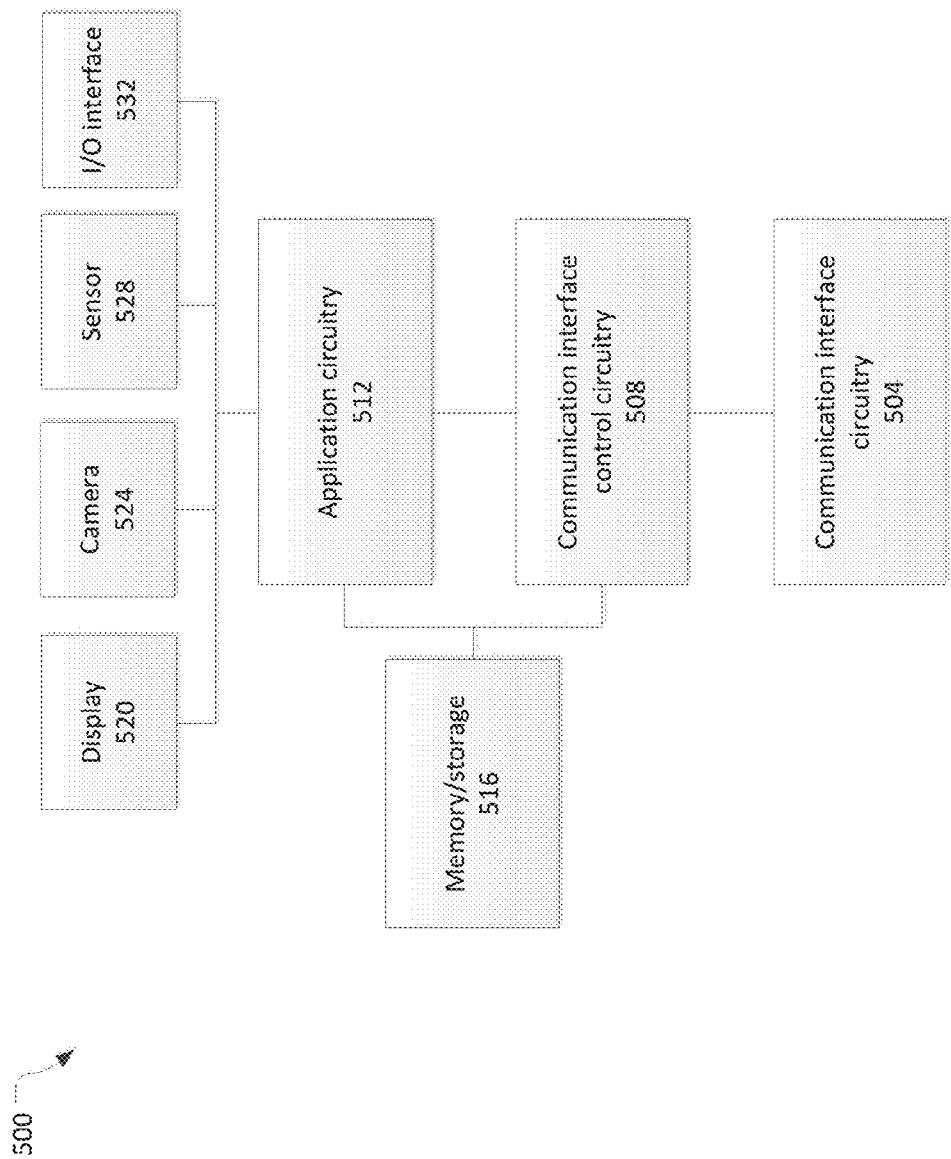
FIG. 5 illustrates an example system, in accordance with various embodiments.

The UEs and eNBs described herein may be implemented into a system using any suitable hardware, firmware, or software configured as desired. FIG. 5 illustrates, for one embodiment, an example of system 500 comprising communication interface circuitry 504, communication interface control circuitry 508, application circuitry 512, memory/storage 516, display 520, camera 524, sensor 528, and input/output (I/O) interface 532, coupled with each other at least as shown.

The application circuitry 512 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 516 and configured to execute instructions stored in the memory/storage 516 to enable various applications or operating systems running on the system 500.

The communication interface control circuitry 508 may include circuitry such as, but not limited to, one or more single-core or multi-core processors. The processor(s) may include baseband processors, digital signal processors, etc. The communication interface control circuitry 508 may handle various control functions that enable communication with one or more networks via the communication interface circuitry 504. The control functions may include, but are not limited to, signal modulation, encoding, decoding, radio frequency shifting, etc.

In some embodiments, the communication interface control circuitry 508 may include baseband circuitry to provide for communication compatible with one or more radio technologies. For example, in some embodiments, the baseband circuitry may support communication with an E-UTRAN or other wireless metropolitan area networks (WMAN), a wireless local area network (WLAN), or a wireless personal area network (WPAN). Embodiments in which the baseband circuitry is configured to support radio communications of more than one wireless protocol may be referred to as multi-mode baseband circuitry.

In some embodiments, the communication interface control circuitry 508 may include other signal processing circuitry to provide for communication compatible with one or more wired networks.

Communication interface circuitry 504 may be a wired or wireless interface that enables communication with one or more networks such as, for example, a wireless network using modulated electromagnetic radiation through a non-solid medium, a wired network, an optical network, etc. In various embodiments, the communication interface circuitry 504 may include switches, filters, amplifiers, etc., to facilitate the communication with appropriate networks.

In embodiments in which the system is implemented as a UE, the detection circuitry 204 and connection circuitry 208 may be implemented in the communication interface control circuitry 508 or the communication interface circuitry 504; and the communication circuitry 212 may be implemented in the communication interface circuitry 504.

In embodiments in which the system is implemented as an eNB, the configuration circuitry 304 may be implemented in the communication interface control circuitry 508; and the communication circuitry 308 may be implemented in the communication interface circuitry 504.

Memory/storage 516 may be used to load and store data or instructions, for example, for system 500. Memory/storage 516 for one embodiment may include any combination of suitable volatile memory (e.g., dynamic random access memory (DRAM)) or non-volatile memory (e.g., Flash memory).

In some embodiments, some or all of the constituent components of the communication interface control circuitry 508, the communication interface circuitry 504, or the memory/storage 516 may be implemented together on a system on a chip (SOC).

In various embodiments, the I/O interface 532 may include one or more user interfaces designed to enable user interaction with the system 500 or peripheral component interfaces designed to enable peripheral component interaction with the system 500. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 528 may include one or more sensing devices to determine environmental conditions or location information related to the system 500. In some embodiments, the sensors may include, but are not limited to, a gyro sensor, an accelerometer, a proximity sensor, an ambient light sensor, and a positioning unit. The positioning unit may also be part of, or interact with, the baseband circuitry 508 or RF circuitry 504 to communicate with components of a positioning network, e.g., a global positioning system (GPS) satellite.

In various embodiments, the display 520 may include a display (e.g., liquid crystals display, a touch screen display, etc.).

In various embodiments, the system 500 may be a UE (e.g., mobile computing device such as, but not limited to, a laptop computing device, a tablet computing device, a netbook, an ultrabook, a smartphone, etc) or an eNB. In various embodiments, system 500 may have more or fewer components, or different architectures.

The following paragraphs describe examples of various embodiments.

Example 1 includes an apparatus comprising: detection circuitry to detect a radio link failure (RLF) event; connection circuitry, coupled with the detection circuitry, to: acquire a master information block (MIB) from a target cell; determine whether first system information (SI) of a target cell is available at the apparatus based on said detecting of the RLF event; if the first SI is determined to not be available, acquire one or more system information blocks (SIBs) with second SI and perform a radio resource connection (RRC) connection reestablishment procedure based on the second SI; if the first SI is determined to be available, determine whether the first SI and the MIB were received within a common broadcast control channel (BCCH) modification period; and if the first SI and the MIB are determined to have been received within the common BCCH modification period, perform an RRC connection reestablishment procedure based on the first SI.

Example 2 includes the apparatus of example 1, wherein the connection circuitry is further to: if the first SI and the MIB are determined to have not been received within the common BCCH modification period, determine whether the first SI is valid; if the first SI is determined to be valid, perform the RRC connection reestablishment procedure based on the first SI; and if the first SI is determined to be not valid, acquire one or more SIBs with second SI and perform the RRC connection reestablishment procedure based on the second SI.

Example 3 includes the apparatus of example 2, wherein the connection circuitry is further to: read a first system information value tag (systemInfoValueTag) from a system information block 1 (SIB1); and determine the first SI is valid if the first systemInfoValueTag is determined to match a second systemInfoValueTag associated with the first SI.

Example 4 includes the apparatus any of examples 1-3, wherein the first SI and the second SI are received in respective system information blocks.

Example 5 includes the apparatus of any of examples 1-4, wherein the target cell is a secondary cell (SCell).

Example 6 includes the apparatus of any of examples 1-5, further comprising receive circuitry to: receive a broadcast system information block message from a serving cell; and acquire the first SI from the broadcast system information block message.

Example 7 includes the apparatus of any of examples 1-5, further comprising receive circuitry to: receive a dedicated radio resource control (RRC) signaling message from a serving cell; and acquire the first SI from the dedicated RRC signaling message.

Example 8 includes apparatus of any of examples 1-7, wherein the BCCH modification period is an integer multiple of a paging cycle of an eNB of the target cell.

Example 9 includes one or more non-transitory, computer-readable media having instructions that, when executed, cause a user equipment (UE) to: detect a radio link failure (RLF) event; select a target cell; acquire first system information (SI) of the target cell and broadcast control channel modification (BCCH) period information from dedicated signaling from a serving cell; determine whether a time of acquisition of the first SI is within a current BCCH period; if the time of acquisition is determined to be within the current BCCH period, perform a radio resource control (RRC) connection reestablishment procedure based on the first SI; if time of acquisition of the first SI is determined not to be within the current BCCH period, determine whether the first SI is valid; if the first SI is determined to be valid, perform the RRC connection reestablishment procedure based on the first SI; and if the first SI is determined to be not valid, acquire second SI of the target cell and perform the RRC connection reestablishment procedure based on the second SI.

Example 10 includes the one or more computer-readable media of example 9, wherein the target cell is a secondary cell (SCell) in a carrier aggregation or a dual connectivity system.

Example 11 includes the one or more computer-readable media of any of examples 9-10, wherein the serving cell is of a master eNB (MeNB).

Example 12 includes the one or more computer-readable media of any of examples 9-11, wherein the BCCH period information includes a modification period coefficient and a default paging cycle and the instructions, when executed, further cause the UE to: determine the current BCCH period based on the modification period coefficient and the default paging cycle.

Example 13 includes the one or more computer-readable media of any of examples 9-12, wherein the instructions, when executed, further cause the UE to: determine the first SI is valid if a first system information value tag associated with the first SI matches a second system information value tag from a system information block from the target cell.

Example 14 includes the one or more computer-readable media of any of examples 9-13, wherein the current BCCH period is based on an integer multiple of a paging cycle of an eNB of the target cell.

Example 15 includes an evolved Node B (eNB) comprising: communication circuitry to receive system information from a neighbor eNB, the system information to include information that is also transmitted by the neighbor eNB in system information blocks in the neighbor cell; configuration circuitry, coupled with the communication circuitry, to generate a system information message that includes the system information and to control the communication circuitry to transmit the system information to a UE in a serving cell of the eNB.

Example 16 includes the eNB of example 15, wherein the system information message further includes a system information value tag and broadcast control channel (BCCH) information.

Example 17 includes the eNB of example 16, wherein the BCCH information includes an indication of modification period coefficient and a default paging cycle.

Example 18 include the eNB of example 17, wherein the modification period coefficient is an integer.

Example 19 includes the eNB of any of examples 15-18, wherein the configuration circuitry is further to provide, via the communication circuitry, a measurement configuration to the UE, the measurement configuration to configure a predetermined serving cell quality threshold below which the UE is to acquire system information of neighbor cells.

Example 20 includes the eNB of any of examples 15-19, wherein the communication circuitry is to transmit the system information message in dedicated signaling.

Example 21 includes the eNB of example 20, wherein the dedicated signaling includes a radio resource control (RRC) message.

Example 22 includes the eNB of any of examples 15-21, wherein the communication circuitry is to transmit the system information message in broadcast signaling.

Example 23 includes the eNB of example 22, wherein the broadcast signaling includes a system information block.

Example 24 includes a method of operating a user equipment (UE), the method comprising: detecting a radio link failure (RLF) event; acquiring a master information block (MIB) from a target cell; determining whether first system information (SI) of a target cell is available at the UE based on said detecting of the RLF event; if the first SI is determined to not be available, acquiring one or more system information blocks (SIBs) with second SI and perform a radio resource connection (RRC) connection reestablishment procedure based on the second SI; if the first SI is determined to be available, determining whether the first SI and the MIB were received within a common broadcast control channel (BCCH) modification period; and if the first SI and the MIB are determined to have been received within the common BCCH modification period, performing an RRC connection reestablishment procedure based on the first SI.

Example 25 includes the method of example 24, further comprising: if the first SI and the MIB are determined to have not been received within the common BCCH modification period, determining whether the first SI is valid; if the first SI is determined to be valid, performing the RRC connection reestablishment procedure based on the first SI; and if the first SI is determined to be not valid, acquiring one or more SIBs with second SI and perform the RRC connection reestablishment procedure based on the second SI.

Example 26. The method of example 25, further comprising: reading a first system information value tag (systemInfoValueTag) from a system information block 1 (SIB1); and determining the first SI is valid if the first systemInfoValueTag is determined to match a second systemInfoValueTag associated with the first SI.

Example 27 includes the method of any of examples 24-26, wherein the first SI and the second SI are received in respective system information blocks.

Example 28 includes the method of any of examples 24-27, wherein the target cell is a secondary cell (SCell).

Example 29 includes the method of any of examples 24-28, further comprising: receiving a broadcast system information block message from a serving cell; and acquiring the first SI from the broadcast system information block message.

Example 30 includes the method of any of examples 24-28, further comprising: receiving a dedicated radio resource control (RRC) signaling message from a serving cell; and acquiring the first SI from the dedicated RRC signaling message.

Example 31 includes the method of any of examples 24-30, wherein the BCCH modification period is an integer multiple of a paging cycle of an eNB of the target cell.

Example 32 includes a method of operating a user equipment (UE) comprising: detecting a radio link failure (RLF) event; selecting a target cell; acquiring first system information (SI) of the target cell and broadcast control channel modification (BCCH) period information from dedicated signaling from a serving cell; determining whether a time of acquisition of the first SI is within a current BCCH period; if the time of acquisition is determined to be within the current BCCH period, performing a radio resource control (RRC) connection reestablishment procedure based on the first SI; if time of acquisition of the first SI is determined not to be within the current BCCH period, determining whether the first SI is valid; if the first SI is determined to be valid, performing the RRC connection reestablishment procedure based on the first SI; and if the first SI is determined to be not valid, acquiring second SI of the target cell and perform the RRC connection reestablishment procedure based on the second SI.

Example 33 includes the method of example 32, wherein the target cell is a secondary cell (SCell) in a carrier aggregation or a dual connectivity system.

Example 34 includes the method of any of examples 32-33, wherein the serving cell is of a master eNB (MeNB).

Example 35 includes the method of any of examples 32-34, wherein the BCCH period information includes a modification period coefficient and a default paging cycle and the method further comprises: determining the current BCCH period based on the modification period coefficient and the default paging cycle.

Example 36 includes the method of any of examples 32-35, further comprising: determining the first SI is valid if a first system information value tag associated with the first SI matches a second system information value tag from a system information block from the target cell.

Example 37 includes the method of any of examples 32-36, wherein the current BCCH period is based on an integer multiple of a paging cycle of an eNB of the target cell.

Example 38 includes a method of operating an evolved Node B (eNB) comprising: processing system information received from a neighbor eNB, the system information to include information that is also transmitted by the neighbor eNB in system information blocks in the neighbor cell; generating a system information message that includes the system information; and transmitting the system information to a UE in a serving cell of the eNB.

Example includes the method of example 38, wherein the system information message further includes a system information value tag and broadcast control channel (BCCH) information.

Example 40 includes the method of example 38, wherein the BCCH information includes an indication of modification period coefficient and a default paging cycle.

Example 41 includes the method of example 40, wherein the modification period coefficient is an integer.

Example 42 includes the method of any of examples 38-41, further comprising: providing a measurement configuration to the UE, the measurement configuration to configure a predetermined serving cell quality threshold below which the UE is to acquire system information of neighbor cells.

Example 43 includes the method of any of examples 38-42, further comprising: transmitting the system information message in dedicated signaling.

Example 44 includes the method of example 43, wherein the dedicated signaling includes a radio resource control (RRC) message.

Example 45 includes the method of any of examples 38-44, further comprising: transmitting the system information message in broadcast signaling.

Example 46 includes the method of example 45, wherein the broadcast signaling includes a system information block.

Example 47 includes one or more computer-readable media having instructions that, when executed, cause a device to perform the method of any of examples 24-46.

Example 48 includes an apparatus having means configured to perform the method of any of claims 24-46.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. One or more non-transitory, computer-readable media having instructions that, when executed, cause a user equipment (UE) to:
    detect a radio link failure (RLF) event;
    select a target cell;
    acquire first system information (SI) of the target cell and broadcast control channel modification (BCCH) period information from dedicated signaling from a serving cell;
    determine whether a time of acquisition of the first SI is within a current BCCH period;
    if the time of acquisition is determined to be within the current BCCH period, perform a radio resource control (RRC) connection reestablishment procedure based on the first SI;
    if time of acquisition of the first SI is determined not to be within the current BCCH period, determine whether the first SI is valid;
    if the first SI is determined to be valid, perform the RRC connection reestablishment procedure based on the first SI; and
    if the first SI is determined to be not valid, acquire second SI of the target cell and perform the RRC connection reestablishment procedure based on the second SI.

2. The one or more computer-readable media of claim 1, wherein the target cell is a secondary cell (SCell) in a carrier aggregation or a dual connectivity system.

3. The one or more computer-readable media of claim 1, wherein the serving cell is of a master eNB (MeNB).

4. The one or more computer-readable media of claim 1, wherein the BCCH period information includes a modification period coefficient and a default paging cycle and the instructions, when executed, further cause the UE to:
    determine the current BCCH period based on the modification period coefficient and the default paging cycle.

5. The one or more computer-readable media of claim 1, wherein the instructions, when executed, further cause the UE to:
    determine the first SI is valid if a first system information value tag associated with the first SI matches a second system information value tag from a system information block from the target cell.

6. The one or more computer-readable media of claim 1, wherein the current BCCH period is based on an integer multiple of a paging cycle of an eNB of the target cell.

* * * * *